No. 755,709. PATENTED MAR. 29, 1904.
C. P. E. SCHNEIDER.
METHOD OF LOCALLY SOFTENING OR ANNEALING
HARDENED STEEL PLATES.
APPLICATION FILED OCT. 12, 1903.
NO MODEL.
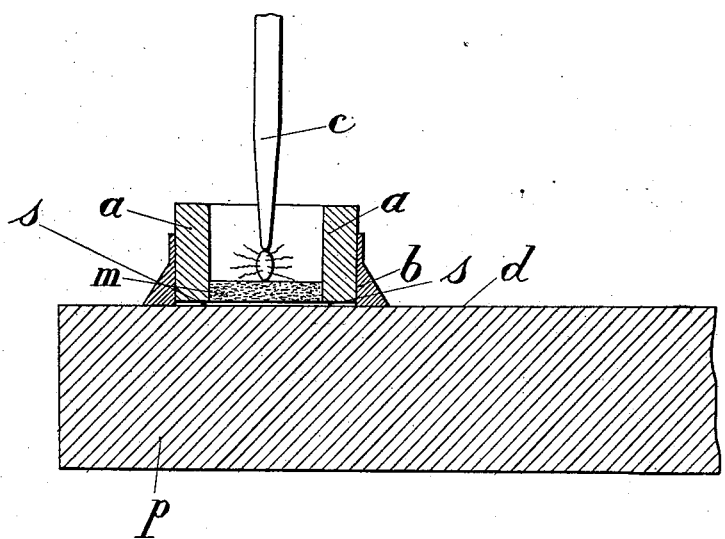

No. 755,709. Patented March 29, 1904.

UNITED STATES PATENT OFFICE.

CHARLES PROSPER EUGÈNE SCHNEIDER, OF LE CREUZOT, FRANCE.

METHOD OF LOCALLY SOFTENING OR ANNEALING HARDENED-STEEL PLATES.

SPECIFICATION forming part of Letters Patent No. 755,709, dated March 29, 1904.

Application filed October 12, 1903. Serial No. 176,718. (No specimens.)

*To all whom it may concern:*

Be it known that I, CHARLES PROSPER EUGÈNE SCHNEIDER, of Le Creuzot, Saône-et-Loire, France, have invented a certain new and useful Method of Locally Softening or Annealing Hardened-Steel Plates; and I do hereby declare the following to be a full, clear, and exact description of the invention, such as will enable others skilled in the art to which it appertains to make and use the same.

This invention has reference to a method of locally softening or annealing hardened-steel plates for permitting the cold working thereof.

Cemented and tempered steel plates, such as are used for armoring vessels and other structures, are unattackable by ordinary cutting or drilling tools. Nevertheless certain of these plates require for constructional purposes to be pierced or planed on the surface of impact. This is frequently the case with the armor-plates of gun-turrets, and especially so with armor belt-plates. When these operations have to be performed on armor-plates that are finished as regards their metallurgical treatment, the following methods have been adopted: first, successive annealings with the blow-lamp and piercing the softened part; second, local annealing by the passage of an electric current of low tension but great volume; third, substituting for the cemented surface one of softer metal by means of the electric arc; fourth, attacking the cemented surface by an acid rendered more active by an electric current; fifth, wearing away the cemented surface by emery placed at the end of a rod or tube of plastic metal. The sole object of these various methods is the piercing of holes of small dimensions. Some of the methods are long and present certain difficulties of application. Others have the inconvenience of resulting in uncertain and inefficient work. Not one of them is applicable for working on a surface of considerable area.

The method I have devised comprises the following advantages: First, there is no need to use any special plant except that for generating the source of heat; second, it can be applied to quite large surfaces; third, the heating is of short duration and can be done on all parts of a plate even if it be considerably bent—say to the form of a segment one-sixth of the circumference of a circle—without necessitating the displacement of the plate; fourth, the cemented surface of the plate does not present any defects after annealing and can be cut or screw-threaded without difficulty.

The method consists principally in bringing into contact with the cemented surface to be worked a very fusible metal of any suitable composition, which is heated to redness by an electric arc or blow-lamp. The heat of the arc is regularly and uniformly transmitted to the cemented surface by the intermediary of the fusible composition, the heat being transmitted to all parts which this intermediate conductor touches and solely to these parts. It will therefore be seen that if the surface upon which the layer of fused composition rests is limited by a frame or inclosure consisting of a sort of mold without a bottom it is possible by these means to anneal the plate locally at a place of any desired extent or shape. As the aforesaid bottomless molds permit of extending or limiting the layer of fusible composition while giving it a suitable thickness, I can employ various arrangements.

The accompanying drawing shows by way of example one arrangement for carrying the invention into practice.

$p$ is the steel plate, of which $d$ is the cemented hardened surface. The part of the surface which is required to be softened or annealed will, for example, be limited by means of a frame of bricks set on a thin layer of sand $s$, forming a joint between the said brick frame and the steel plate. A border of argillaceous earth $b$ forms an external luting or packing for the brick frame. The surface to be covered with the fusible composition being thus clearly defined, the said composition is poured in a molten state into the brick frame to a height of several centimeters. An electric arc is then formed between the carbon $c$ and the surface of the molten composition $m$. The latter is heated to redness and transmits its heat to the plate, the cemented surface of which is thus softened or annealed locally. To avoid raising the temperature of the surface of the plate higher than the point of recalescence during the heating, which would cause in certain metals a tempering on cooling, and to avoid the oxidation and volatilization of the molten composition the heatings are alternated with coolings of approximately equal duration. The temperature can be estimated by plunging into the molten composition immediately after the passage of the current a small bar of steel. The temperature will be observed clearly diminishing from the surface of the molten composition to the surface of contact with the plate after a very short immersion of the rod. The layer of molten composition remains red at the surface after a stop of several minutes only when the cemented surface of the steel plate is itself raised to a red heat. To reduce as much as possible the waste of the molten composition by oxidation, its surface is sprinkled with soot or pulverized charcoal. When the surface of the plate to be annealed is of large dimensions, it will be necessary to form several electric arcs equally separated on the surface of the molten composition.

Instead of a frame of bricks $a$ I can employ removable frames of refractory material—such as stiffened cement, concrete, or the like—said frames being easily transportable from one place to another.

The fusible composition $m$ will be preferably a metal or alloy of high specific heat. The only essential condition to fulfil is that the temperature of fusion of this metal or alloy shall be lower than the temperature of recalescence of the part of the plate to be softened. Lead, plumbers' solder, antifriction metal, aluminium can all be used. The heating of the fusible composition $m$, which serves to transmit the heat, can be obtained by generating therein an induced electric current by means of an exterior transformer suitably arranged or by the passage of an electric current through a filament of high electric resistance, which is thereby rendered incandescent.

What I claim, and desire to secure by Letters Patent of the United States, is—

1. The method of locally softening or annealing the surface of steel, consisting in distributing heat to said surface by means of a molten substance in contact therewith, regularly supplying heat to said molten substance while in contact with said surface of steel and maintaining the temperature of the latter below that of its recalescence, whereby the steel is locally softened or annealed.

2. The method of locally softening or annealing the surface of steel, consisting in distributing heat to said surface by means of molten metal in contact therewith, regularly supplying heat to said molten metal, while in contact with said surface of steel and maintaining the temperature of the latter below that of its recalescence, whereby the steel is locally softened or annealed.

3. The method of locally softening or annealing the surface of steel consisting in applying to said surface metallic lead and fusing the same, whereby the steel becomes locally softened or annealed.

4. The method of locally softening or annealing the surface of steel consisting in applying to said surface a fusible substance whose temperature of fusion is lower than the temperature of recalescence of the steel to be softened, and then fusing the same, whereby the steel becomes locally softened or annealed.

5. The method of locally softening or annealing the surface of steel, consisting in applying to said surface a fusible substance, fusing the same, regularly supplying heat to said fused substance by means of an electric arc formed between said fused substance and a suitable electrode whereby said fused substance distributes heat to said steel surface, and maintaining the temperature of the steel surface below that of recalescence.

6. The method of locally softening or annealing the surface of steel, consisting in distributing heat to said surface by means of molten metal in contact therewith, regularly supplying heat to said molten metal while in contact with said surface by means of an electric arc formed between said molten metal and a suitable electrode and maintaining the temperature of the steel below that of its recalescence, whereby the molten metal distributes the heat of the electric arc to the surface of the steel, the latter thereby being locally softened or annealed.

7. The method of locally softening or annealing the surface of steel armor-plate consisting in inclosing the given surface by a mold, applying to said inclosed surface a fusible metallic substance, heating the same to the fusion-point, regularly supplying heat to the fused metallic substance, whereby the latter distributes said heat to the said plate and maintaining the latter below the point of recalescence.

In witness whereof I have hereunto set my hand in presence of two witnesses.

CHARLES PROSPER EUGÈNE SCHNEIDER.

Witnesses:
JEAN GAMET,
GEORGES BOURETTE.